G. FACCIOLI.
VOLTAGE REGULATING SYSTEM.
APPLICATION FILED AUG. 31, 1921.

1,423,926.

Patented July 25, 1922.
2 SHEETS—SHEET 1.

Inventor:
Giuseppe Faccioli,
by Albert G. Davis
His Attorney.

G. FACCIOLI.
VOLTAGE REGULATING SYSTEM.
APPLICATION FILED AUG. 31, 1921.

1,423,926.

Patented July 25, 1922.
2 SHEETS—SHEET 2.

Inventor:
Giuseppe Faccioli,
by *[signature]*
His Attorney

UNITED STATES PATENT OFFICE.

GIUSEPPE FACCIOLI, OF PITTSFIELD, MASSACHUSETTS, ASSIGNOR TO GENERAL ELECTRIC COMPANY, A CORPORATION OF NEW YORK.

VOLTAGE-REGULATING SYSTEM.

1,423,926.  Specification of Letters Patent.  Patented July 25, 1922.

Application filed August 31, 1921. Serial No. 497,232.

*To all whom it may concern:*

Be it known that I, GIUSEPPE FACCIOLI, a citizen of the United States, residing at Pittsfield, in the county of Berkshire, State of Massachusetts, have invented certain new and useful Improvements in Voltage-Regulating Systems, of which the following is a specification.

My invention relates to voltage regulating systems for alternating current distribution circuits.

In alternating current distribution systems it is sometimes desirable that the phase and magnitude of the voltage at some predetermined point on the system should be the same as the phase and magnitude of some other voltage and it is the object of my invention to provide an arrangement of induction regulators whereby it is possible to obtain a voltage of any desired magnitude and of any desired phase at a predetermined point on an alternating current distribution system.

My invention will be better understood from the following description taken in connection with the accompanying drawings and its scope will be pointed out in the appended claims.

Figure 1:
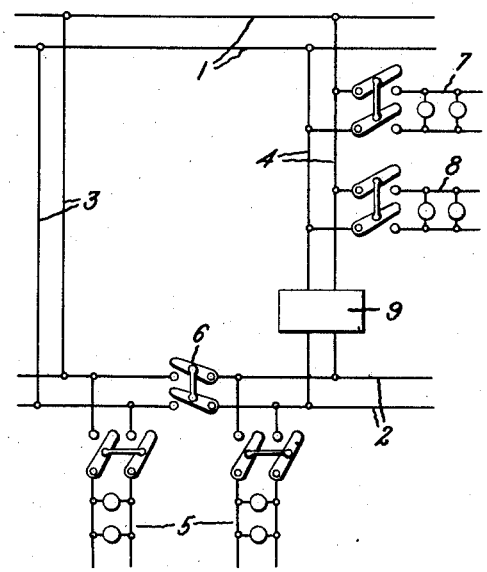
Figure 2:
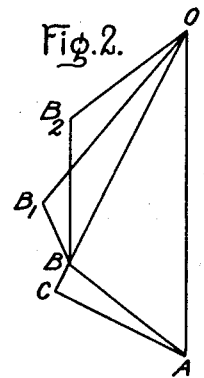
Figure 3:
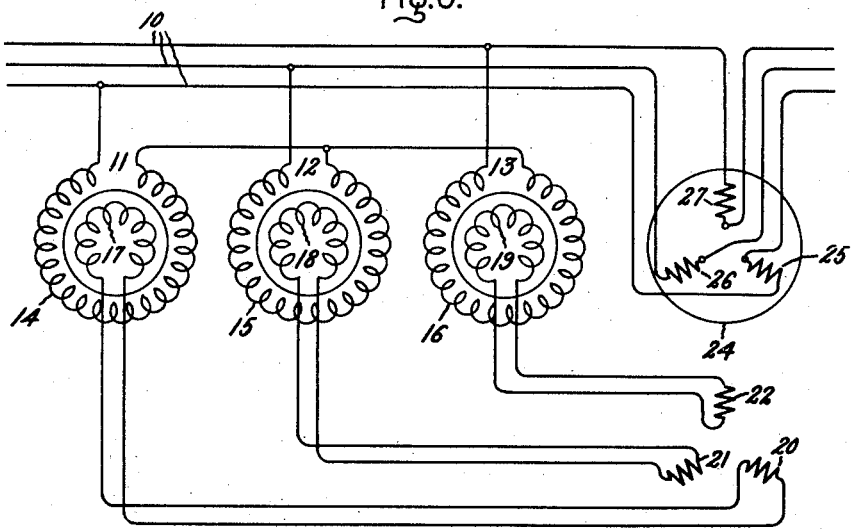
Figure 4:
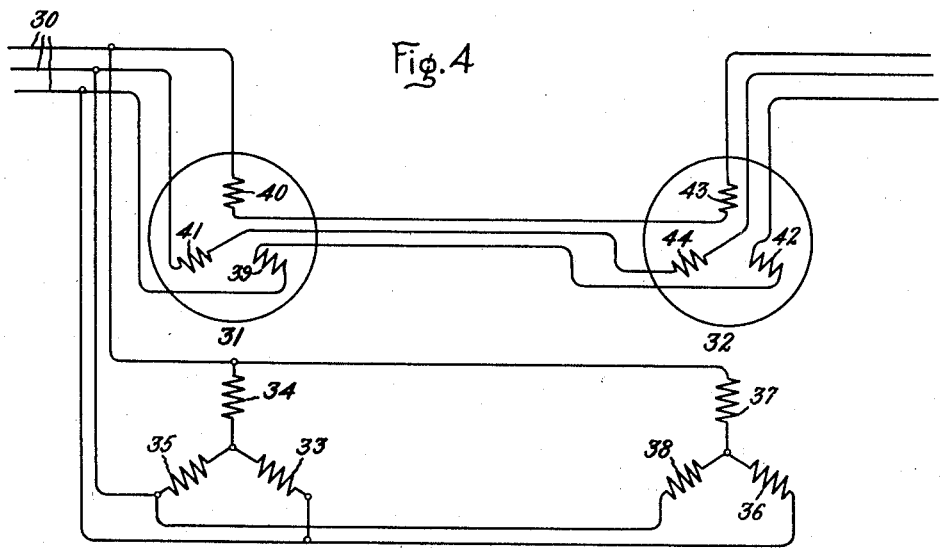
Figure 5:
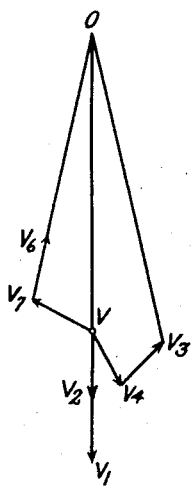

Referring to the drawings, Fig. 1 is a diagram showing a transmission system wherein my invention may be used to advantage; Fig. 2 is a vector diagram showing the effect that different loads connected to one of the feeders shown in Fig. 1 have upon the voltage at the end of the feeder; Fig. 3 is a diagram showing one embodiment of my invention in which I employ a plurality of single phase induction regulators and one polyphase induction regulator; Fig. 4 is a modification of the arrangement shown in Fig. 3 in which I employ a plurality of polyphase induction regulators; and Fig. 5 is a vector diagram showing the results that can be obtained from the arrangement shown in Fig. 4.

Fig. 1 shows a transmission system comprising a generator bus 1, a load bus 2, and two parallel feeders 3 and 4 connecting the generator bus 1 and the load bus 2. 5 represents a load connected to the load bus and 6 represents any suitable switching means for connecting together the two sections of the load bus, connected to the feeders 3 and 4 respectively. The feeder 3 is shown as running directly to the load bus 2, whereas the feeder 4 is shown as being arranged to supply the variable loads 7 and 8 at points between the generator bus and the load bus. In order properly to distribute the loads between the feeders 3 and 4 when the switching means 6 is closed, it is necessary to equip one of the feeders with a regulating device 9 which is capable of producing different compensating voltages according to the load on the feeder 4.

Referring to Fig. 2, let OA represent the voltage across the generator bus 1 in Fig. 1 and OB represent the voltage across the load bus 2 when the loads 7 and 8 are disconnected from the feeder 4 so that the feeder 4 is under the same conditions as the feeder 3. Therefore, AB is the voltage drop in each feeder, BC being the ohmic drop and AC the reactance drop. In this case the switching means 6 can be closed without the use of any regulating device in the feeder 4. Let it now be assumed that the feeder 4 supplies energy to the load 7 in addition to the load 5. Then the diagram in Fig. 2 will no longer apply to the feeder 4. The voltage at the end of the feeder 4 is now $OB_1$ and therefore the switching means 6 cannot be closed without producing a circulating current unless a regulating device in the feeder 4 raises the voltage at the end of the feeder from the value $OB_1$ to the value OB and at the same time shifts the phase of $OB_1$ into OB. Similarly, if the feeder 4 supplies the load 8 in addition to the loads 5 and 7 so that the voltage at the end of the feeder is $OB_2$, a regulating device is again necessary to shift in magnitude and in phase the voltage at the end of the feeder 4 from $OB_2$ to OB. A similar condition would arise in case the feeder 4 supplied voltage to the loads 5 and 8 only.

The above is simply an illustration of the necessity of having a regulating device 9 in the feeder 4 which will produce compensating voltages varying in magnitude and phase. While I have shown the regulating device 9 as being connected near the end of the feeder 4, it is evident that it may be connected at any desired point in the feeder.

In Fig. 3 I have shown an arrangement of induction regulators whereby I am able to produce in an alternating current distribution circuit compensating voltages varying in magnitude and phase. It is well known that a single-phase induction regulator produces a regulating voltage in phase with the exciting voltage but varying in magnitude depending upon the position of the rotor of the regulator. It is also well-known that a polyphase induction regulator produces a regulating voltage which always has the same magnitude relative to exciting voltage but is shifted in phase with respect to the exciting voltage by varying the position of the rotor of the regulator. By connecting these different types of induction regulators in the manner shown in Fig. 3, I am able to obtain regulating voltages varying in magnitude and phase.

In Fig. 3, 10 represents a three-phase alternating current circuit the voltage of which it is desired to regulate. 11, 12 and 13 represents three single-phase induction regulators having primary windings 14, 15 and 16 and secondary windings 17, 18 and 19 respectively. The primary windings 14, 15 and 16 are connected in Y across the alternating current circuit 10 and the secondary windings 17, 18 and 19 are connected to the primary windings 20, 21 and 22 respectively of a three-phase induction regulator 24. The secondary windings 25, 26 and 27 of the three-phase induction regulator are connected in series with the three-phase alternating current circuit 10. By rotating the rotors of the single-phase induction regulators regulating voltages of different magnitudes are obtained but always in phase with the voltage impressed upon the corresponding primary winding. Voltages of the desired magnitude can, therefore, be supplied to the primary windings of the three-phase regulator 24. Now by rotating the rotor of the polyphase induction regulator 24 independently of the single-phase regulator the magnitudes of the secondary voltages of the polyphase regulator relative to the primary voltages are not changed, but the phase of the secondary voltages is shifted so that a resultant voltage of any desired phase can be produced in the alternating current circuit 10.

It will be understood that my invention is not limited to the joint use of single-phase and polyphase induction regulators to obtain the desired regulation. In the modification of my invention shown in Fig. 4, I employ two polyphase induction regulators to obtain the desired regulating voltages. In this figure 30 represents a three-phase alternating current circuit the voltage of which it is desired to regulate. 31 and 32 represent two three-phase induction regulators having their rotors relatively rotatable and having their primary windings 33, 34, 35 and 36, 37 and 38 connected in parallel across the three-phase alternating current circuit 30, and their secondary windings 39, 40, and 41 and 42, 43 and 44 connected in series with the three-phase alternating current circuit. By relatively rotating the rotors of the two induction regulators regulating voltages of any desired magnitude and phase can be obtained.

Referring to Fig. 5, if OV is the voltage of one phase of the alternating current circuit and a voltage $OV_1$ is desired, the rotors of the two induction regulators are moved so that their respective voltages are $V\ V_2$ and $V_2\ V_1$. Similarly, if the voltage $OV_3$ is desired, the rotors of the two induction regulators are moved so that their respective voltages are $V\ V_4$ and $V_4\ V_3$. Likewise, any other voltage, such as $OV_6$ may be obtained by moving the rotors so that their voltages, such as $V\ V_7$ and $V_7\ V_6$, give the desired regulating voltage. It is apparent that in this manner I can obtain regulating voltages of any desired phase and of any desired magnitude up to the algebraic sum of the voltages of the two induction regulators. While I have shown two separate polyphase regulators, it is evident that the two regulators could be combined into one structure.

While I have shown and described several embodiments of my invention, I do not desire to be limited to the exact arrangement shown and described, but seek to cover in the appended claims all those modifications which come within the true spirit and scope of my invention.

What I claim as new and desire to secure by Letters Patent of the United States, is:—

1. In combination, an alternating current circuit and voltage regulating means therefor comprising a plurality of induction regulators having interconnected windings and independently rotatable rotors so that voltages varying in magnitude and phase are produced in said circuit by varying the relative positions of the rotors of said induction regulators.

2. In combination, a polyphase circuit and voltage regulating means therefor comprising a polyphase induction regulator connected in said circuit, and a second induction regulator having its primary winding excited from said circuit and its secondary winding connected to a winding of said polyphase induction regulator so that the resultant voltages produced in one phase of said polyphase circuit by varying the relative positions of the rotors of said induction regulators vary in magnitude and phase.

3. In combination, a polyphase circuit and voltage regulating means therefor comprising two polyphase induction regulators having their primary windings connected in parallel across the polyphase circuit and their secondary windings in series with said circuit and their rotors independently rotatable so that the resultant voltages produced in said circuit by varying the relative positions of the rotors of said induction regulators vary in magnitude and phase.

In witness whereof, I have hereunto set my hand this 27 day of August, 1921.

GIUSEPPE FACCIOLI.